United States Patent Office 3,369,119
Patented Feb. 13, 1968

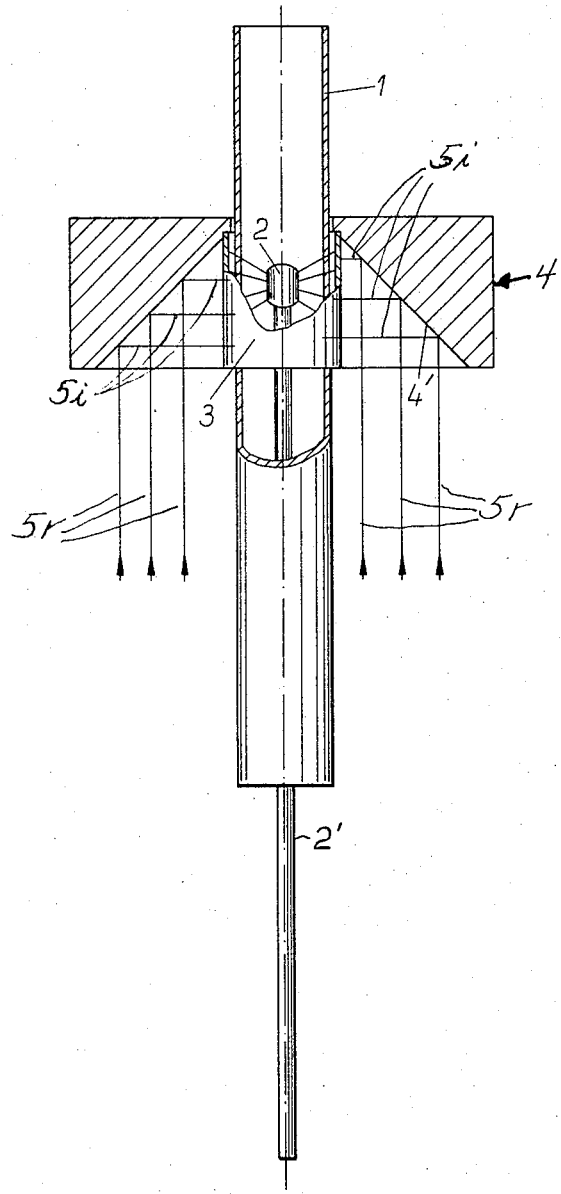

3,369,119
APPARATUS FOR EXAMINING TUBES COMPRISING AN X-RAY SOURCE AND FLUORESCENT SCREEN
Heinz Brachvogel, Vaduz, Liechtenstein, assignor to Contina Bureaux- und Rechenmaschinenfabrik Aktiengesellschaft, Mauren, Liechtenstein
Filed Mar. 19, 1964, Ser. No. 353,199
Claims priority, application Germany, Mar. 21, 1963, B 71,223
6 Claims. (Cl. 250—71)

This invention relates in general to apparatus for and method of examining tubes and in particular to a new and useful device for examining tubes which includes means for directing a source of radiation through the wall of the tubes to produce an image on a surface which produces an image in response to such radiation.

The present invention provides an improved apparatus wherein a radiation source is located within a tube to be examined so that the radiation will penetrate through the tube outwardly onto a fluorescent screen located around the tube in a position to produce a fluorescent image in accordance with the radiation which penetrates the wall of the tube.

In a preferred arrangement, the invention includes means for easily viewing the radiation produced, and advantageously includes a panoramic viewing means. Such panoramic viewing means may comprise, for example, a concave or conical reflecting surface arranged to direct light emitted radially outwardly from the viewing screen into a direction which will be at right angles thereto or substantially parallel to the axis of the tube being examined. The radiation source in the present invention is a source of radiation capable of passing through the wall of the tube to be examined and to cause a fluorescence or visual indication on a fluorescent or comparable screen. Such a source, for example, may comprise an X-ray tube or a body of radioactive material.

According to the invention, the apparatus for examining tubes comprises a radiation source over which the tube is positioned, or continuously moved; and with an indication means such as a fluorescent screen arranged radially outwardly from the radiation source and the tube to be examined in a position so that the fluorescence or similar indications produced by the radiation through the walls of the tube will be readily apparent.

The apparatus also preferably includes a panoramic viewing means for viewing the whole image which is produced on the fluorescent screen.

The inventive method simply comprises the examination of a tube with the use of a radiation source and a fluorescent screen comprising positioning a tube to be examined such that the radiation source will be directed through the walls of the tube and onto the fluorescent screen and observing the fluorescence produced by the radiation on the screen.

In a preferred arrangement the method may be carried out continuously by continuously moving the tube, or the radiation source and the receiving screen relative to the tube and by observing the visual indications directly on the fluorescent screen or by reflecting the indications such that they may be viewed in a panoramic manner. Thus, the invention provides a method of examining tubing during continuous production thereof and for continuously controlling the manufacturing of such tubing by advancing the tubing as it is produced between a radiation source and a cylindrical fluorescent screen so that its wall lies between the source and the screen, and then deflecting the fluorescent indications indicated on the screen and produced by the radiation onto a panoramic viewer, so that the reflections which are viewed may be employed to control the manufacture of the tubing.

Accordingly, it is an object of the invention to provide an improved method and apparatus for examining tubing.

A further object of the invention is to provide an apparatus for examining tubing which comprises a radiation source and a fluorescent screen arranged in spaced relationship to permit a tube to be passed therebetween so that the radiations from the radiation source will be directed through the tube and onto the screen to produce a fluorescence on the screen.

A further object of the invention is to provide an apparatus which includes a tubular fluorescent screen arranged around a central radiation source between which a tube to be examined may be positioned so that the radiation will pass through the walls of the tube and be indicated as fluorescence on the screen, and further including reflector means for transposing the fluorescence indicated on the screen into a panoramic view.

A further object of the invention is to provide a method for examining tubes with the use of a radiation source and an annular viewing screen, comprising directing the tube between the radiation source and the screen and viewing the indications of the fluorescence thereon to determine the characteristics of the tube.

A further object of the invention is to provide an apparatus for examining tubes which is simple in design, rugged in construction and economical to manufacture, and to an improved method for examining tubes, particularly for the continuous examination thereof which is relatively inexpensive to carry out and simple to execute.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

The only drawing figure is a somewhat schematic partially sectional and partial plan view of a tube examining device constructed in accordance with the invention.

Referring to the drawing in particular, a tube 1 which is to be examined is indicated as it is being advanced continuously through a circular opening at one end of an annular screen member 3 which is arranged coaxial with a central radiation source 2, such as an X-ray tube. The X-ray tube 2 has an elongated extension 2' which extends beyond the end of the tube 1 being examined. The cylindrical fluorescence screen 3 is such that it fluoresces under radiation from the source 2. When the tube 1 is positioned between the radiation source 2 and the screen 3, the radiation from the source penetrates through the walls of the tube and a fluorescent indication is given on the screen 3.

In the embodiment illustrated, the image of a complete annular section of the tube is picked up by the annular screen 3, and panoramic viewing means 4 are provided around the exterior of the screen 3 for transposing the image on the screen into a panoramic view. The panoramic viewing means 4 advantageously comprises a concave or conical reflecting surface 4' which surrounds the screen 3 of a construction such that the light emitted radially from the screen will be directed at a substantially right angles thereto or substantially in the direction of the axis of the tube 1 as indicated by light rays $5_l$ and $5_r$.

The invention method may be carried out in a continuous manner by continuously advancing either the tube 1 between the screen 3 and the radiation source 2, or by moving the screen and the radiation source along the tube, and by noting the indications of the radiations produced on the screen as the tube is advanced. In addition, the method may be carried out by transposing the radiations produced on the annular fluorescence screen into a panoramic image.

While a specific embodiment of the invention has been shown and described in detail to illustrate the application of the inventive principles, it will be understood that the invention may be embodied otherwise without departing from such principles.

What is claimed is:

1. Apparatus for examining tubes comprising a radiation source, a cylindrical fluorescent screen surrounding the radiation source, means for positioning a tube so that its wall lies between the source and the screen whereby to produce a fluorescent image of said wall upon the screen, and panoramic viewing means for viewing the whole of said image.

2. Apparatus for examining tubes comprising a radiation source, a cylindrical fluorescent screen surrounding the radiation source, said source being located on the axis of said cylindrical screen, means for positioning a tube coaxially with said screen so that its wall lies between the source and the screen whereby to produce a fluorescent image of said wall upon the screen, and optical means surrounding the screen and arranged to produce a panoramic view of the fluorescent image.

3. Apparatus as claimed in claim 2, wherein the optical means comprises an annular reflector having a conical reflecting surface.

4. A device for examining tubes comprising a radiation source, radiation sensitive means spaced from said radiation source, the radiation source being such that it will produce an indication on said radiation sensitive means, means for positioning a tube to be examined between said radiation source and said radiation sensitive means so that the radiation from said source will be passed through the walls of the tube and onto said radiation sensitive means, and panoramic view means adjacent said radiation sensitive means for viewing the whole of the image produced on said radiation sensitive means by said radiation source.

5. A device for examining tubes comprising a cylindrical fluorescent screen, a radiation source within said screen spaced apart from said screen radially sufficiently to permit a tube to be examined when positioned between said radiation source and said screen, said radiation source being such that the radiations produced thereby will influence said screen, and panoramic viewing means surrounding said screen for viewing the whole image produced on said screen by said radiation source.

6. A device for examining tubes comprising a cylindrical fluorescent screen, a radiation source within said screen spaced apart from said screen radially sufficiently to permit a tube to be examined when positioned between said radiation source and said screen, said radiation source being such that the radiations produced thereby will influence said screen, and panoramic viewing means surrounding said screen for viewing the whole image produced on said screen by said radiation source, said panoramic viewing means comprising a reflector body surrounding said screen and having a surface such that light emitted from said screen will be reflected in a direction substantially parallel to the axis of the tube to be examined.

References Cited

UNITED STATES PATENTS

| | | | |
|---|---|---|---|
| 2,298,942 | 10/1942 | Hicks et al. | 250—83.3 X |
| 2,905,824 | 9/1959 | Thielsch | 250—65 X |
| 2,964,630 | 12/1960 | Bosch | 250—83.3 X |

ARCHIE R. BORCHELT, *Primary Examiner.*

RALPH G. NILSON, *Examiner.*